UNITED STATES PATENT OFFICE.

AUGUST E. SCHUTTE, OF NORTHBORO, MASSACHUSETTS.

PAVEMENT COMPOSITION AND STRUCTURE.

1,265,259. Specification of Letters Patent. Patented May 7, 1918.

No Drawing. Application filed August 16, 1916. Serial No. 115,266.

*To all whom it may concern:*

Be it known that I, AUGUST E. SCHUTTE, of Northboro, in the county of Worcester and State of Massachusetts, a citizen of the United States, have invented a new and useful Improvement in Pavement Compositions and Structures, of which the following is a specification.

My invention resides in a paving composition or structure comprising wear-resisting material, such as broken stone, gravel or sand, and asbestos or mineral fiber reinforcing and holding the mineral aggregate together when permeated and cemented by an asphaltic or bituminous binder to form a wearing or other layer adapted to be laid on any suitable foundation for a road or street pavment.

The amount of fiber capable of being mixed with the bituminous cement depends upon the nature and the consistency of the cement. A comparatively soft bituminous cement will take as much as 60% by weight of asbestos fiber, while to a harder cement only about 40% could be added.

Bituminous cement when used by itself is readily affected by heat and cold, becoming brittle at cold temperatures and soft, pliable or even easily displaceable at hot temperatures. To obviate that to a more or less extent fine particles of mineral matter, such as ground limestone, clay, etc., have been added. These materials produce a cement which is somewhat less affected by the atmosphere, but the addition of these materials also tends to destroy the cementing properties of the bitumen.

In my invention, however, the fibrous nature of the mineral fiber does not destroy the adhesive properties of the asphaltic cement, but in fact enhances not only its adhesive but also its cohesive properties, because the fibers reach throughout the entire mass and make a particularly tough, wear-resisting, tenacious medium for the cementing of the mineral particles.

To produce my matrix of bituminous cement and asbestos or mineral fiber I prefer first to melt the asphalt or bitumen and while in a hot state add to it the requisite amount of the asbestos or mineral fiber. I do not confine myself entirely to asbestos, as there are similar mineral fibrous materials of an analogous nature that can be used.

To produce a paving structure it is preferable to heat the stony particles, which can be of uniform size or mixtures containing as little as possible fine material or dust, and while it is in a heated condition add to it the bituminous cement containing the asbestos fiber prepared as aforesaid, or the stone can be heated when the bituminous cement can be added and then the asbestos mixed with the mineral and cement. The amount of the bituminous compound required varies somewhat with the nature of the stone and the sizes which are used. If a uniform sized stone is used, about 18% by weight of the bitumen-asbestos matrix is required. If the stone contains finer particles and therefore if the voids in the mineral structure are reduced, a smaller amount of the bitumen-asbestos compound can be used. Enough in each case should be used to coat the stone and fill the spaces between them.

It is a well known fact that any uniform sized stone, no matter of what dimensions, will have when compacted from 40% to 45% of voids, and I therefore do not confine myself to stone of any particular size. It may be from two inches down to one-quarter inch in size.

This bitumen-asbestos matrix is mixed while hot with the hot stone until the mass is entirely coated, when it is hauled on the street and can be placed there in any desirable way upon a suitable foundation, it being unnecessary to roll the material after it is spread. It can, however, be rolled if so desired.

Another way to produce my paving structure using a matrix of bituminous cement and mineral fiber, such as asbestos is by a method which is well known as the "penetration method," that is, the stone is first placed upon the foundation and rolled to the required grade, after which the bituminous matrix is poured upon and into the stone structure, filling the spaces and producing the surface.

I am aware that bituminous structures have been composed of mineral aggregates of various sizes cemented with bituminous cement, in which case stability in the aggregate is produced by careful filling of the voids in the mineral aggregate *per se*, so as to reduce the voids to a minimum of below 21%, as the structure patented by Frederick John Warren under Patent No. 727,505.

I am also aware of the fact that attempts have been made to use fibrous materials such as grass, paper pulp, etc., as admixtures for bituminous cement, but all of these materials are affected by heat, so that they are almost entirely destroyed by the time they are mixed with the hot bituminous cement. On the other hand, the mineral fiber is not only not affected by heat, but also, on account of its divisibility into fine long fibers produces a material particularly suitable for the toughening of bituminous cement.

I am not aware, however, of any paving composition or structure in which the mineral aggregate is reinforced and held together by bituminous cement and mineral fiber, such as asbestos, nor am I aware of any paving structure where the voids in the aggregate are over 30% or even 40% and where the interstitial spaces are filled with a tough wear-resisting composition, such as bituminous cement having mineral fiber, as asbestos, incorporated with it.

There are many advantages to the structure which I produce, for example:—

First,—a remarkably tough, wear-resisting surface is made which on account of the large amount of interstitial composition as compared with the amount of stone is particularly tough, waterproof and requires no flush-coating, for the spaces occupied by the composition are practically one-third to one-half of the stone, so that as the wear goes on there is always enough composition present to cover and take care of the cracked or worn-off stone, practically reflushing itself as the wear goes on;

Second,—on account of the nature of structure and the large amount of composition which is between the mineral, the wear comes mostly on the composition, which is tough and semi-plastic and therefore produces a particularly silent pavement;

Third,—the structure produces a pavement which will not roll nor rut, this being due partially to the web of mineral, the spaces of which are filled with the composition, which on account of the mineral fiber is particularly tough and viscous in the sense of resistance to displacement.

Another advantage which I may mention is the ease with which this pavement can be constructed, eliminating all expensive machinery and complicated processes, making it possible for those even only partially skilled in the art to produce a successful pavement.

Another advantage, and an important one, is the ease with which such pavement can be repaired. The interstitial composition being composed of asbestos fiber and bitumen is not destroyed by reheating or segregation and having no intermediate and fine particles, can easily be remelted and again placed in the same holes from which it was taken.

In some cases the bituminous cement-mineral fiber composition can be used without the admixture of stone as a waterproof wearing surface by pouring it upon the surface of the aggregate or mixture and combining it superficially with it as in repairs or flush-coatings.

What I claim as my invention is:

1. A pavement structure comprising wear-resisting material mixed with a bituminous cement having mineral fiber incorporated therewith.

2. A pavement structure comprising wear-resisting material mixed with a bituminous cement having asbestos fiber incorporated therewith.

3. A pavement structure having not less than 50% of wear-resisting particles, the spaces between said particles being filled with a bituminous cement having mineral fiber incorporated therewith.

4. A street paving structure comprising wear-resisting ingredients, a bituminous binder therefor, and a mesh of mineral fiber incorporated with and retained by said binder to permeate and reinforce the entire mass.

5. A street paving structure comprising wear-resisting ingredients, a body of mineral fiber within the spaces surrounding said ingredients and in mesh therewith, and a bituminous binder cementing the whole together.

6. A street paving structure comprising crushed rock or gravel, a bituminous binder therefor, and a wear-resisting body of mineral fiber incorporated with and retained by said binder to fill the voids between said ingredients and otherwise reinforce the mass.

AUGUST E. SCHUTTE.